US011159405B2

(12) United States Patent
Basile et al.

(10) Patent No.: US 11,159,405 B2
(45) Date of Patent: *Oct. 26, 2021

(54) MANAGING A COMMUNICATIONS SYSTEM BASED ON SOFTWARE DEFINED NETWORKING (SDN) ARCHITECTURE (71) Applicant: Corning Optical Communications LLC, Charlotte, NC (US)

(72) Inventors: Robert Fred Basile, Tega Cay, SC (US); Jason Elliott Greene, Hickory, NC (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/836,136

(22) Filed: Mar. 31, 2020

(65) Prior Publication Data
US 2020/0228428 A1 Jul. 16, 2020

Related U.S. Application Data

(63) Continuation of application No. 16/195,149, filed on Nov. 19, 2018, now Pat. No. 10,680,920, which is a
(Continued)

(51) Int. Cl.
*H04B 10/00* (2013.01)
*H04L 12/26* (2006.01)
(Continued)

(52) U.S. Cl.
CPC ..... *H04L 43/065* (2013.01); *H04B 10/25753* (2013.01); *H04L 41/0816* (2013.01);
(Continued)

(58) Field of Classification Search
CPC ............. H04L 41/5067; H04L 41/0896; H04L 43/0811; H04L 41/5025; H04L 41/0816; H04B 10/25753
See application file for complete search history.

(56) References Cited

U.S. PATENT DOCUMENTS 7,583,735 B2   9/2009   Bauman et al.
7,787,854 B2   8/2010   Conyers et al.
(Continued)

FOREIGN PATENT DOCUMENTS

EP   3035562 A1   6/2016
WO   2008112688 A1   9/2008
(Continued)

OTHER PUBLICATIONS

"Critical." Merriam-Webster.com. Accessed May 16, 2018. https://www.merriam-webster.com/dictionary/critical.
(Continued)

*Primary Examiner* — Tanya T Motsinger
(74) *Attorney, Agent, or Firm* — C. Keith Montgomery (57) ABSTRACT

Embodiments of the disclosure relate to managing a communications system based on software defined networking (SDN) architecture. An SDN controller is provided in the communications system to manage a wireless distribution system (WDS) and a local area network (LAN) based on SDN architecture. The SDN controller is communicatively coupled to a WDS control system in the WDS and a LAN control system in the LAN via respective SDN control data plane interfaces (CDPIs). The SDN controller analyzes a WDS performance report and a LAN performance report and provides a WDS configuration instruction(s) and/or a LAN configuration instruction(s) to the WDS control system and/or the LAN control system to reconfigure a WDS element(s) and/or a LAN element(s) to improve quality-of-experiences (QoEs) of the communications system. Monitoring and optimizing the WDS and the LAN based on a unified software-based network management platform can improve performance at reduced operational costs and complexity.

19 Claims, 8 Drawing Sheets

Related U.S. Application Data continuation of application No. 15/482,890, filed on Apr. 10, 2017, now Pat. No. 10,135,706.

(51) Int. Cl.
  *H04L 12/24* (2006.01)
  *H04B 10/2575* (2013.01)

(52) U.S. Cl.
  CPC ...... *H04L 41/0896* (2013.01); *H04L 41/5025* (2013.01); *H04L 41/5067* (2013.01); *H04L 43/0811* (2013.01); *H04L 43/0817* (2013.01)

(56) References Cited

U.S. PATENT DOCUMENTS

| | | | |
|---|---|---|---|
| 7,853,735 B2 | 12/2010 | Jin et al. | |
| 9,398,464 B2 | 7/2016 | Kummetz et al. | |
| 9,420,628 B2 | 8/2016 | Spedaliere et al. | |
| 9,531,473 B2 | 12/2016 | Lemson et al. | |
| 9,565,596 B2 | 2/2017 | Watkins et al. | |
| 9,681,396 B2 | 6/2017 | Williamson | |
| 9,813,164 B2 | 11/2017 | Berlin et al. | |
| 9,820,171 B2 | 11/2017 | Lemson et al. | |
| 9,913,147 B2 | 3/2018 | Brighenti et al. | |
| 2002/0058499 A1* | 5/2002 | Ortiz .................. | H04L 63/083 455/412.1 |
| 2004/0077354 A1 | 4/2004 | Jason et al. | |
| 2006/0046730 A1 | 3/2006 | Briancon et al. | |
| 2006/0221913 A1 | 10/2006 | Hermel et al. | |
| 2006/0223515 A1 | 10/2006 | Hermel et al. | |
| 2007/0177552 A1 | 8/2007 | Wu et al. | |
| 2008/0253314 A1 | 10/2008 | Stephenson et al. | |
| 2010/0087227 A1 | 4/2010 | Francos et al. | |
| 2011/0216697 A1* | 9/2011 | Lai .................. | H04W 4/00 370/328 |
| 2012/0039254 A1 | 2/2012 | Stapleton et al. | |
| 2012/0039320 A1 | 2/2012 | Lemson et al. | |
| 2012/0264367 A1* | 10/2012 | Aguirre .................. | H04W 52/54 455/3.06 |
| 2012/0314710 A1 | 12/2012 | Shikano | |
| 2013/0259465 A1 | 10/2013 | Blair | |
| 2015/0037041 A1 | 2/2015 | Cune et al. | |
| 2016/0046730 A1 | 2/2016 | Ghayur et al. | |
| 2016/0219024 A1* | 7/2016 | Verzun .................. | H04L 9/34 |
| 2016/0330077 A1 | 11/2016 | Jin et al. | |
| 2016/0337896 A1 | 11/2016 | Rajagopalan et al. | |
| 2016/0373310 A1 | 12/2016 | Banikazemi et al. | |
| 2017/0085354 A1* | 3/2017 | Kudekar .................. | H04L 1/1825 |
| 2017/0273211 A1* | 9/2017 | Kerpez .................. | H04L 41/142 |
| 2017/0272792 A1 | 9/2017 | Bachmutsky et al. | |
| 2017/0279577 A1* | 9/2017 | Shekalim .................. | H04L 5/0035 |
| 2017/0288716 A1* | 10/2017 | Daniel .................. | H04B 1/12 |
| 2017/0308395 A1 | 10/2017 | Cook et al. | |
| 2017/0318561 A1* | 11/2017 | Harel .................. | H04W 88/085 |
| 2018/0013630 A1 | 1/2018 | Tatlicioglu et al. | |
| 2018/0076869 A1* | 3/2018 | Aue .................. | H04B 7/0617 |
| 2018/0103383 A1 | 4/2018 | Berlin et al. | |
| 2018/0123721 A1 | 5/2018 | Rosenfelder | |
| 2018/0132184 A1 | 5/2018 | Yakobi | |
| 2018/0159628 A1* | 6/2018 | Ben-Shlomo .................. | H04W 72/04 |
| 2018/0212693 A1* | 7/2018 | Harel .................. | H04W 24/02 |
| 2018/0248590 A1* | 8/2018 | Abraha .................. | H04W 4/33 |
| 2018/0248639 A1* | 8/2018 | He .................. | H01Q 1/22 |
| 2018/0248973 A1 | 8/2018 | Cook et al. | |
| 2018/0287966 A1 | 10/2018 | Kamath et al. | |
| 2018/0295037 A1* | 10/2018 | Basile .................. | H04B 10/25753 |
| 2019/0036845 A1 | 1/2019 | Gong | |
| 2020/0412612 A1* | 12/2020 | Cherunni .................. | H04L 41/0896 |

FOREIGN PATENT DOCUMENTS

| | | |
|---|---|---|
| WO | 2015105985 A1 | 7/2015 |
| WO | 2017017672 A1 | 2/2017 |

OTHER PUBLICATIONS

"Local area network (LAN)." Hargrave's Communications Dictionary, Wiley, Frank Hargrave, Wiley, 1st edition, 2001. Credo Reference, https://search.credoreference.com/content/entry/hargravecomms/local_area_network_lan/O?institution Id= 7 43.

International Search Report and Written Opinion of the International Searching Authority; PCT/US2018/024246; dated Jun. 12, 2018; 12 Pages.

\* cited by examiner

MANAGING A COMMUNICATIONS SYSTEM BASED ON SOFTWARE DEFINED NETWORKING (SDN) ARCHITECTURE

PRIORITY APPLICATIONS

This application is a continuation of U.S. application Ser. No. 16/195,149, filed Nov. 19, 2018, which is a continuation of U.S. application Ser. No. 15/482,890, filed Apr. 10, 2017, now U.S. Pat. No. 10,135,706, the contents of which are relied upon and incorporated herein by reference in their entireties, and the benefit of priority under 35 U.S.C. § 120 is hereby claimed.

BACKGROUND

The disclosure relates generally to managing a communications system, and more particularly to managing a communications network, which may include a wireless distribution system (WDS) and a local area network (LAN), based on software defined networking (SDN) architecture.

Wireless customers are increasingly demanding digital data services, such as streaming video signals. At the same time, some wireless customers use their wireless communications devices in areas that are poorly serviced by conventional cellular networks, such as inside certain buildings or areas where there is little cellular coverage. One response to the intersection of these two concerns has been the use of WDSs. WDSs include remote units configured to receive and transmit communications signals to client devices within the antenna range of the remote units. WDSs can be particularly useful when deployed inside buildings or other indoor environments where the wireless communications devices may not otherwise be able to effectively receive radio frequency (RF) signals from a source.

Figure 1:
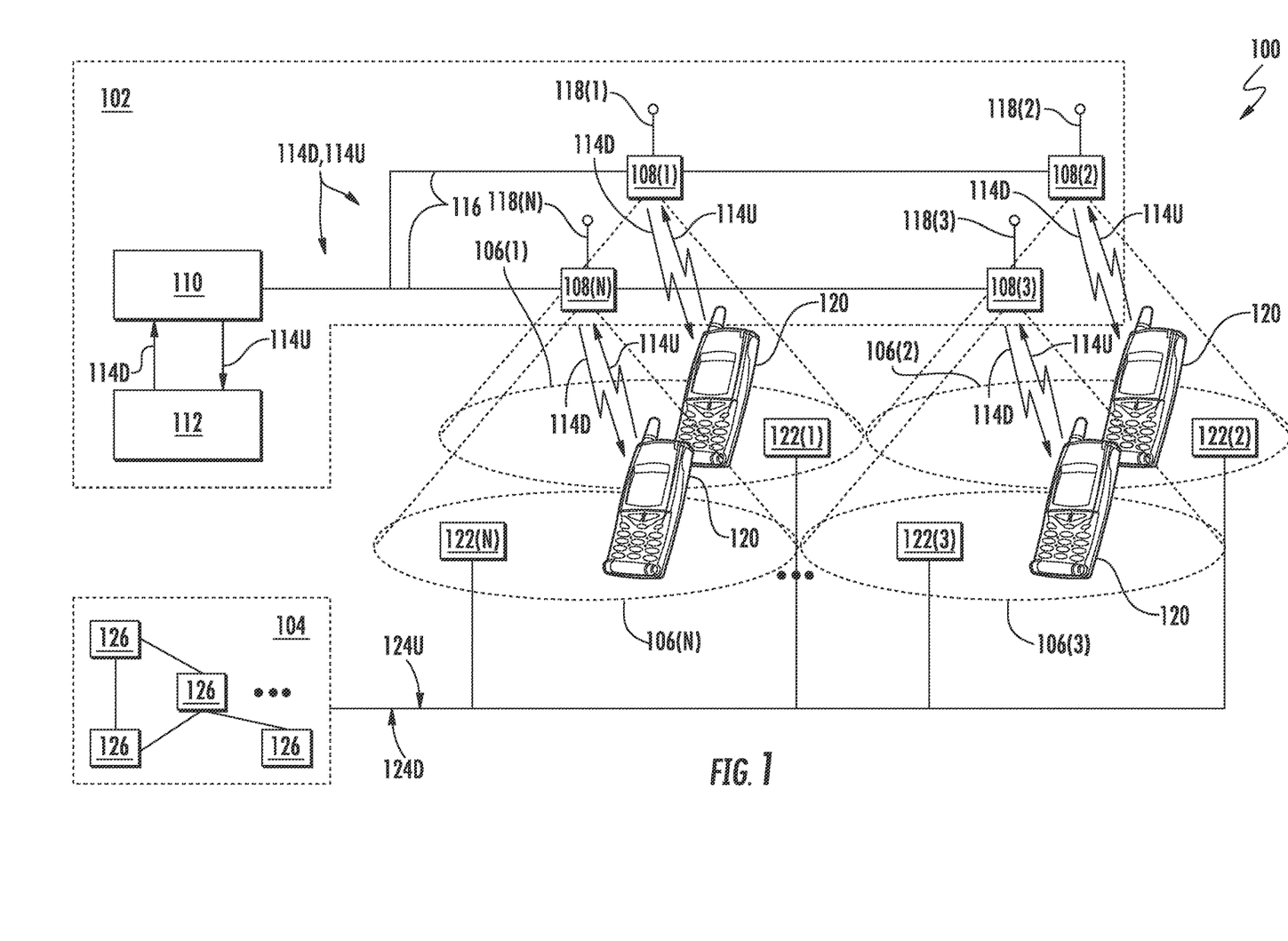
FIG. 1 is a schematic diagram of an exemplary heterogeneous communications system including a wireless distribution system (WDS) and a local area network (LAN) for example.

In this regard, FIG. 1 is a schematic diagram of an exemplary heterogeneous communications system 100 including a WDS 102 and a LAN 104. The WDS 102 is configured to provide communications services to remote coverage areas 106(1)-106(N), wherein 'N' is the number of remote coverage areas. These communications services provided by the WDS 102 can include cellular services such as long-term evolution (LTE) and location-based services based on wireless solutions (Bluetooth, Wi-Fi, Global Positioning System (GPS), and others), as examples. The remote coverage areas 106(1)-106(N) may be remotely located. In this regard, the remote coverage areas 106(1)-106(N) are created by and centered on remote units 108(1)-108(N) connected to a central unit 110 (e.g., a head-end equipment, a head-end controller, or a head-end unit). The central unit 110 may be communicatively coupled to a signal source 112, for example a base transceiver station (BTS) or a baseband unit (BBU). In this regard, the central unit 110 receives WDS downlink communications signals 114D from the signal source 112 to be distributed to the remote units 108(1)-108(N). The remote units 108(1)-108(N) are configured to receive the WDS downlink communications signals 114D from the central unit 110 over a communications medium 116 to be distributed to the respective remote coverage areas 106(1)-106(N) of the remote units 108(1)-108(N). Each of the remote units 108(1)-108(N) may include an RF transmitter/receiver and a respective antenna 118(1)-118(N) operably connected to the RF transmitter/receiver to wirelessly distribute the communications services to client devices 120 within the respective remote coverage areas 106(1)-106(N). The remote units 108(1)-108(N) are also configured to receive WDS uplink communications signals 114U from the client devices 120 in the respective remote coverage areas 106(1)-106(N) to be distributed to the signal source 112. The size of each of the remote coverage areas 106(1)-106(N) is determined by the amount of RF power transmitted by the respective remote units 108(1)-108(N), receiver sensitivity, antenna gain, and RF environment, as well as by RF transmitter/receiver sensitivity of the client devices 120. The client devices 120 usually have a fixed maximum RF receiver sensitivity, so that the above-mentioned properties of the remote units 108(1)-108(N) mainly determine the size of the respective remote coverage areas 106(1)-106(N).

In a non-limiting example, the remote coverage areas 106(1)-106(N) are also configured to be served by RF circuits 122(1)-122(N) (e.g., Wi-Fi Access Points and indoor base stations) that are collocated with the remote units 108(1)-108(N). The RF circuits 122(1)-122(N) are communicatively coupled to the LAN 104 for communicating LAN downlink communications signals 124D and LAN uplink communications signals 124U in the remote coverage areas 106(1)-106(N). In one example, the LAN 104 includes Ethernet switching circuits 126, such as Ethernet switches and/or Ethernet bridges, that are interconnected with the RF circuits 122(1)-122(N). Given that the remote units 108(1)-108(N) and the RF circuits 122(1)-122(N) may be configured to provide wireless services concurrently in the remote coverage areas 106(1)-106(N), it may be desired to manage the WDS 102 and the LAN 104 effectively and efficiently to maximize overall quality-of-experiences (QoEs) of the heterogeneous communications system 100.

No admission is made that any reference cited herein constitutes prior art. Applicant expressly reserves the right to challenge the accuracy and pertinency of any cited documents.

SUMMARY

Embodiments of the disclosure relate to managing a communications system based on software defined networking (SDN) architecture. In examples discussed herein, a communications system includes a wireless distribution system (WDS) and a local area network (LAN). An SDN controller is provided in the communications system to manage the WDS and the LAN based on SDN architecture. The SDN controller is communicatively coupled to a WDS control system in the WDS and a LAN control system in the LAN via respective SDN control data plane interfaces (CDPIs). In one aspect, the SDN controller receives a WDS performance report indicating the operational status of the WDS from the WDS control system. In another aspect, the SDN controller receives a LAN performance report indicating the operational status of the LAN from the LAN control system. The SDN controller analyzes the WDS performance report and the LAN performance report to determine whether a WDS element(s) and/or a LAN element(s) need to be reconfigured to meet predetermined quality-of-experience (QoE) targets of the communications system. Accordingly, the SDN controller provides a WDS configuration instruction(s) and/or a LAN configuration instruction(s) to the WDS control system and/or the LAN control system to reconfigure the WDS element(s) and/or the LAN element(s) to improve the QoEs of the communications system. By managing the WDS and the LAN based on the SDN architecture, it may be possible to monitor and optimize the WDS and the LAN based on a unified software-based network management platform, thus helping to improve performance of a heterogeneous communications system at reduced operational costs and complexity.

In one aspect, a communications system is provided. The communications system includes a WDS control system communicatively coupled to a WDS. The WDS control system is configured to generate a WDS performance report. The WDS control system is also configured to reconfigure the WDS based on a WDS configuration instruction. The communications system also includes a LAN control system communicatively coupled to a LAN. The LAN control system is configured to generate a LAN performance report. The LAN control system is also configured to reconfigure the LAN based on a LAN configuration instruction. The communications system also includes an SDN controller communicatively coupled to the WDS control system and the LAN control system via a first SDN CDPI and a second SDN CDPI, respectively. The SDN controller is configured to receive the WDS performance report and the LAN performance report from the WDS control system and the LAN control system, respectively. The SDN controller is also configured to analyze the WDS performance report and the LAN performance report to determine whether QoEs of the communications system meet predefined performance targets. The SDN controller is also configured to provide the WDS configuration instruction to the WDS control system in response to determining that the WDS needs to be reconfigured to improve the QoEs of the communications system. The SDN controller is also configured to provide the LAN configuration instruction to the LAN control system in response to determining that the LAN needs to be reconfigured to improve the QoEs of the communications system.

In another aspect, a method for managing a communications system based on SDN architecture is provided. The method includes generating a WDS performance report from a WDS control system communicatively coupled to a WDS. The method also includes generating a LAN performance report from a LAN control system communicatively coupled to a LAN. The method also includes communicatively coupling an SDN controller to the WDS control system and the LAN control system via a first SDN CDPI and a second SDN CDPI to receive the WDS performance report and the LAN performance report, respectively. The method also includes analyzing the WDS performance report and the LAN performance report by the SDN controller to determine whether QoEs of the communications system meet predefined performance targets. The method also includes providing a WDS configuration instruction from the SDN controller to the WDS control system in response to determining that the WDS needs to be reconfigured to improve the QoEs of the communications system. The method also includes providing a LAN configuration instruction from the SDN controller to the LAN control system in response to determining that the LAN needs to be reconfigured to improve the QoEs of the communications system. The method also includes reconfiguring the WDS by the WDS control system based on the WDS configuration instruction. The method also includes reconfiguring the LAN by the LAN control system based on the LAN configuration instruction.

In another aspect, an SDN controller in a communications system is provided. The SDN controller is configured to receive a WDS performance report from a WDS control system communicatively coupled to the SDN controller and a WDS. The SDN controller is also configured to receive a LAN performance report from a LAN control system communicatively coupled to the SDN controller and a LAN. The SDN controller is also configured to analyze the WDS performance report and the LAN performance report to determine whether QoEs of the communications system meet predefined performance targets. The SDN controller is also configured to provide a WDS configuration instruction to the WDS control system in response to determining that the WDS needs to be reconfigured to improve the QoEs of the communications system. The SDN controller is also configured to provide a LAN configuration instruction to the LAN control system in response to determining that the LAN needs to be reconfigured to improve the QoEs of the communications system.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Embodiments of the disclosure relate to managing a communications system based on software defined networking (SDN) architecture. In examples discussed herein, a communications system includes a wireless distribution system (WDS) and a local area network (LAN). An SDN controller is provided in the communications system to manage the WDS and the LAN based on SDN architecture. The SDN controller is communicatively coupled to a WDS control system in the WDS and a LAN control system in the LAN via respective SDN control data plane interfaces (CDPIs). In one aspect, the SDN controller receives a WDS performance report indicating the operational status of the WDS from the WDS control system. In another aspect, the SDN controller receives a LAN performance report indicating the operational status of the LAN from the LAN control system. The SDN controller analyzes the WDS performance report and the LAN performance report to determine whether a WDS element(s) and/or a LAN element(s) need to be reconfigured to meet predetermined quality-of-experience (QoE) targets of the communications system. Accordingly, the SDN controller provides a WDS configuration instruction(s) and/or a LAN configuration instruction(s) to the WDS control system and/or the LAN control system to reconfigure the WDS element(s) and/or the LAN element(s) to improve the QoEs of the communications system. By managing the WDS and the LAN based on the SDN architecture, it may be possible to monitor and optimize the WDS and the LAN based on a unified software-based network management platform, thus helping to improve performance of a heterogeneous communications system at reduced operational costs and complexity.

Figure 2:
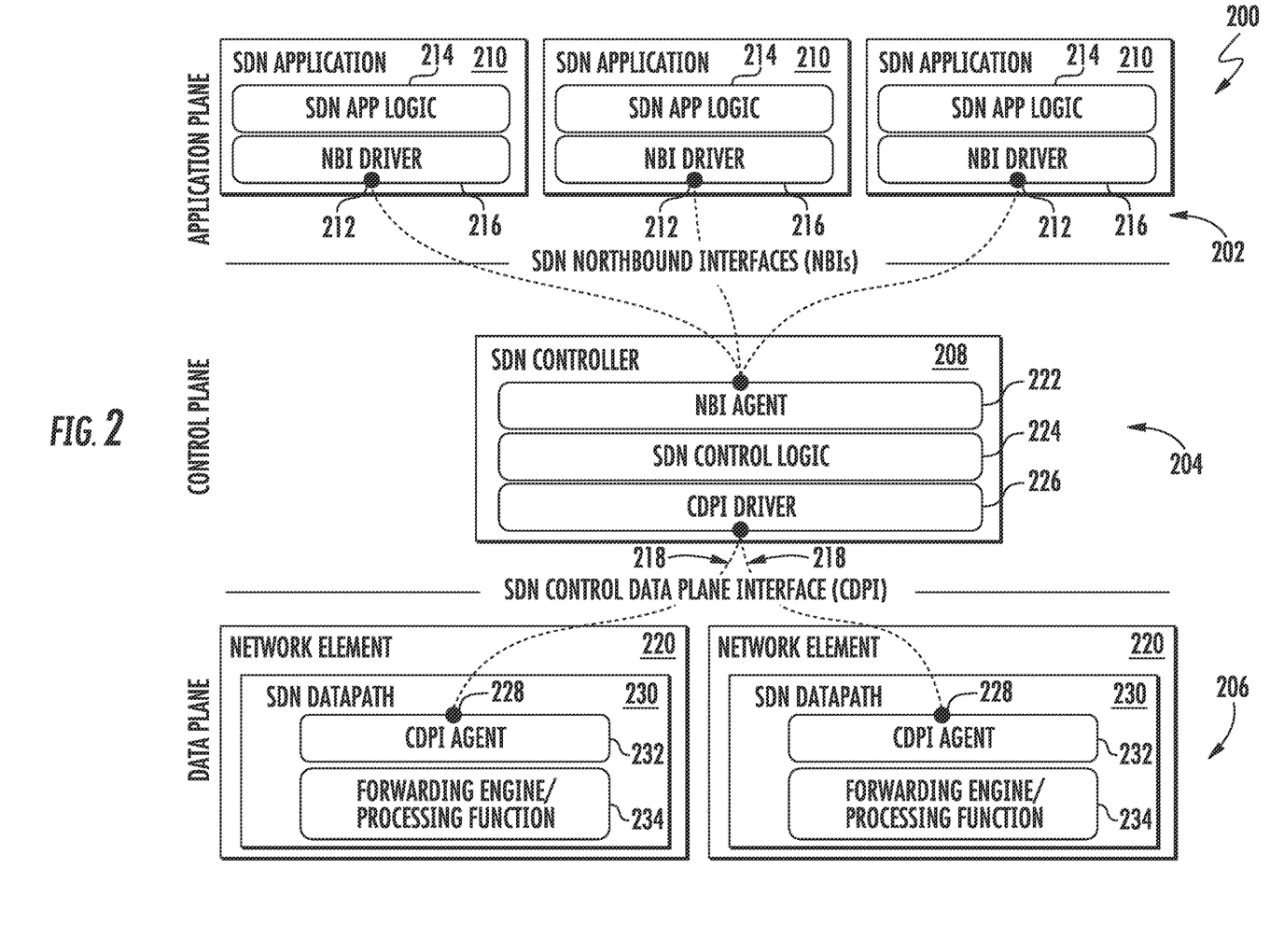
FIG. 2 is a schematic diagram of an exemplary software defined networking (SDN) architecture that can be employed to manage a heterogeneous communications system, such as the heterogeneous communications system of FIG. 1 for example.

Before discussing exemplary aspects of managing a heterogeneous communications system based on SDN architecture, an overview of SDN architecture is first provided with reference to FIG. 2. The discussion of specific exemplary aspects of managing a communications system including a WDS and a LAN based on SDN architecture starts below with reference to FIG. 3.

In this regard, FIG. 2 is a schematic diagram of an exemplary SDN architecture 200 that can be employed to manage a heterogeneous communications system, such as the heterogeneous communications system 100 of FIG. 1 for example. The SDN architecture 200 includes an application plane 202, a control plane 204, and a data plane 206. At the heart of the SDN architecture 200 is an SDN controller 208 located in the control plane 204. The SDN controller 208 interfaces with one or more SDN applications 210 in the application plane 202 via one or more SDN northbound interfaces (NBIs) 212, respectively. In a non-limiting example, each of the SDN applications 210 represent a respective physical network (e.g., a WDS, a LAN, etc.) managed by the SDN controller 208. The SDN applications 210 are programs that can communicate explicitly, directly, and programmatically respective network requirements and desired network QoE targets to the SDN controller 208. Each of the SDN applications 210 includes SDN application logic 214 and at least one NBI driver 216 for communicating with the SDN controller 208 via the SDN NBIs 212.

The SDN controller 208 is a logically centralized entity in charge of translating the network requirements and QoE targets received from the SDN applications 210 into network configuration instructions 218. The SDN controller 208 is configured to provide the network configuration instructions 218 to one or more network elements 220 in the data plane 206. In a non-limiting example, each of the network elements 220 represents a physical network (e.g., a WDS, a LAN, etc.). As such, the SDN controller 208 is further configured to present the network elements 220 to the SDN applications 210 as abstracted views of the physical networks. The SDN controller 208 includes at least one NBI agent 222 configured to communicate with the NBI driver 216 via the SDN NBIs 212. The SDN controller 208 also includes SDN control logic 224, which can be provided as a microcontroller, a microprocessor, or a field programmable gate array (FPGA) for example. The SDN control logic 224 may include memory and/or other types of storage media for storing the network requirements and QoE targets received from the SDN applications 210. The SDN controller 208 also includes at least one CDPI driver 226 for communicating with the network elements 220 via one or more SDN CDPIs 228.

Each of the network elements 220 includes an SDN datapath 230. In a non-limiting example, the SDN datapath 230 is a logical network device that can encompass all or a subset of the physical network (e.g., a WDS, a LAN, etc.). The SDN datapath 230 includes a CDPI agent 232 for communicating with the SDN controller 208 via the SDN CDPIs 228. The SDN datapath 230 may also include at least one forwarding engine/processing function 234 for processing the network configuration instructions 218 and configuring the physical network encompassed by the SDN datapath 230.

The SDN architecture 200 provides a unified software-based platform that can be employed and flexibly configured to manage a heterogeneous communications network. As is further discussed below, the SDN architecture 200 can be employed to manage a communications system including a WDS and a LAN, thus helping to improve performance of the communications system at reduced operational costs and complexity.

Figure 3:
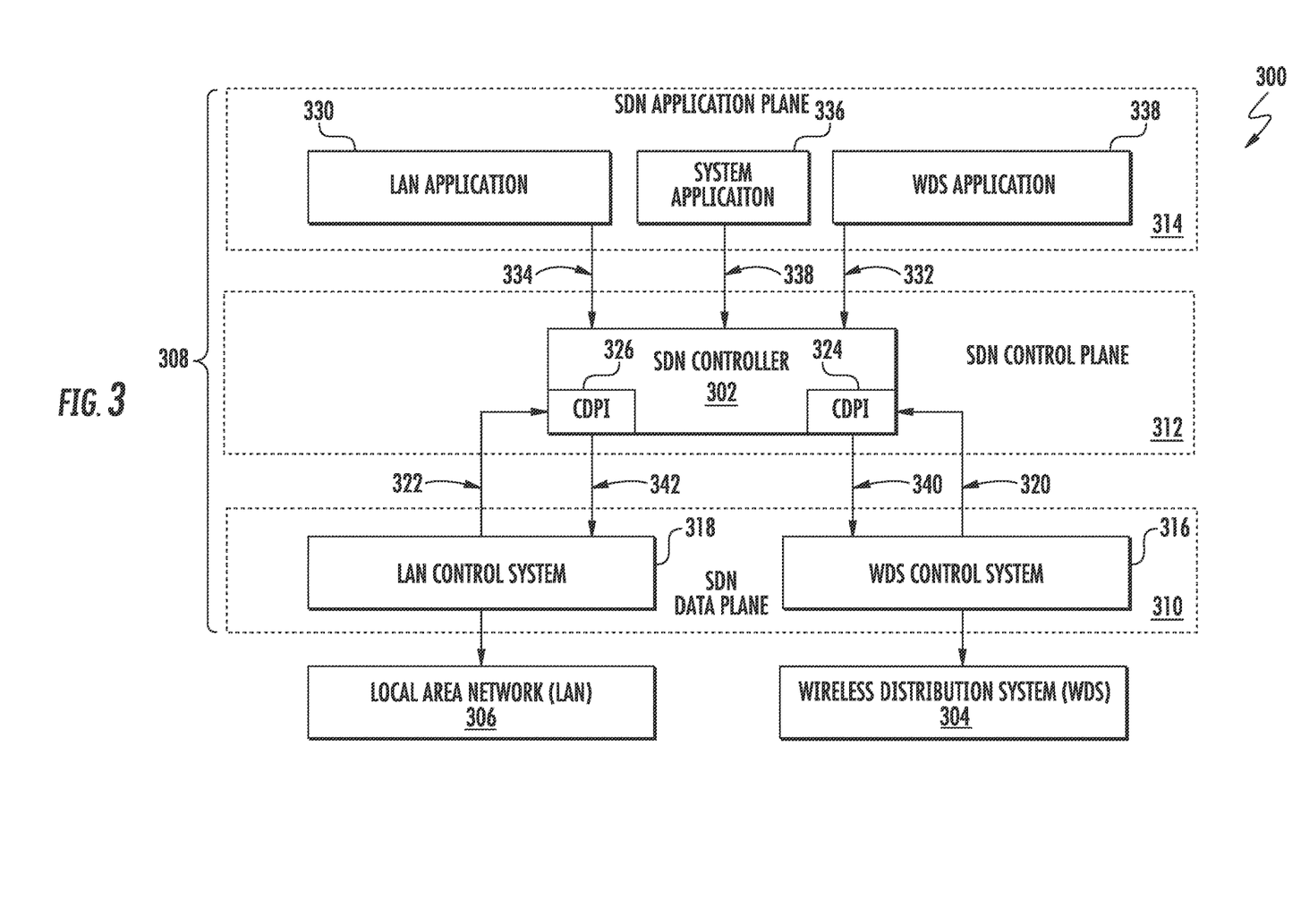
FIG. 3 is a schematic diagram of an exemplary communications system in which an SDN controller is configured to manage a WDS and a LAN based on SDN architecture, such as the SDN architecture of FIG. 2, for improved performance of the communications system.

In this regard, FIG. 3 is a schematic diagram of an exemplary communications system 300 in which an SDN controller 302 is configured to manage a WDS 304 and a LAN 306 based on SDN architecture 308, such as the SDN architecture 200 of FIG. 2, for improved performance of the communications system 300. The SDN architecture 308 includes an SDN data plane 310, an SDN control plane 312, and an SDN application plane 314 that can be functionally equivalent to the data plane 206, the control plane 204, and the application plane 202 of FIG. 2, respectively. The SDN data plane 310 includes a WDS control system 316 and a LAN control system 318 that are functionally equivalent to the SDN datapath 230 of FIG. 2. The WDS control system 316 is communicatively coupled to the WDS 304. The WDS control system 316 is configured to generate a WDS performance report 320 indicating the operational status and QoE measurements of the WDS 304. The LAN control system 318 is communicatively coupled to the LAN 306. The LAN control system 318 is configured to generate a LAN performance report 322 indicating the operational status and QoE measurements of the LAN 306.

The SDN controller 302 is provided in the SDN control plane 312 and is functionally equivalent to the SDN controller 208 of FIG. 2. The SDN controller 302, which can be implemented as a microprocessor, a microcontroller, or an FPGA for example, is communicatively coupled to the WDS control system 316 via a first SDN CDPI 324 and to the LAN control system 318 via a second SDN CDPI 326. The SDN controller 302 is communicatively coupled to a WDS application 328 and a LAN application 330 that are located in the SDN application plane 314. The WDS application 328 and the LAN application 330 are functionally equivalent to the SDN applications 210 of FIG. 2. In this regard, the WDS application 328 is configured to communicate WDS network requirements and QoE targets 332 to the SDN controller 302. Likewise, the LAN application 330 is configured to communicate LAN network requirements and QoE targets 334 to the SDN controller 302. The SDN application plane 314 may further include a system application 336 configured to communicate network requirements and QoE targets 338 of the communications system 300 to the SDN controller 302. The SDN controller 302 may store the WDS network requirements and QoE targets 332, the LAN network requirements and QoE targets 334, and the network requirements and QoE targets 338 of the communications system 300 in such storage media as memory, flash drive, solid state hard drive, etc.

With continuing reference to FIG. 3, the SDN controller 302 receives the WDS performance report 320 from the WDS control system 316 and the LAN performance report 322 from the LAN control system 318. The SDN controller 302 analyzes the WDS performance report 320 and the LAN performance report 322 to determine whether QoEs of the communications system 300 meet predefined performance targets. In a non-limiting example, the predefined performance targets can include network throughput, network capacity, connection count, coverage area RF performance, coverage area interference level, downlink and uplink signal-to-noise ratios (SNRs), call drop rate, handover failure rate, and so on.

The SDN controller 302 provides a WDS configuration instruction 340 to the WDS control system 316 in response to determining that the WDS 304 needs to be reconfigured to improve the QoEs of the communications system 300. In response to receiving the WDS configuration instruction 340, the WDS control system 316 reconfigures the WDS 304 based on the WDS configuration instruction 340. In a non-limiting example, the WDS control system 316 is configured to provide the WDS performance report 320 to the SDN controller 302 and receive the WDS configuration instruction 340 from the SDN controller 302 via the first SDN CDPI 324. Similarly, the SDN controller 302 provides a LAN configuration instruction 342 to the LAN control system 318 in response to determining that the LAN 306 needs to be reconfigured to improve the QoEs of the communications system 300. In response to receiving the LAN configuration instruction 342, the LAN control system 318 reconfigures the LAN 306 based on the LAN configuration instruction 342. In a non-limiting example, the LAN control system 318 is configured to provide the LAN performance report 322 to the SDN controller 302 and receive the LAN configuration instruction 342 from the SDN controller 302 via the second SDN CDPI 326. By managing the communications system 300 based on the SDN architecture 308, it is possible to monitor and adjust both the WDS 304 and the LAN 306 from a unified software-based platform, thus helping to improve overall performance of the communications system 300 at reduced operational costs and complexity.

The communications system 300 can be managed based on the SDN architecture 308 according to a process. In this regard, FIG. 4 is a flowchart of an exemplary process 400 that can be employed to manage the communications system 300 of FIG. 3 based on the SDN architecture 308.

Figure 4:
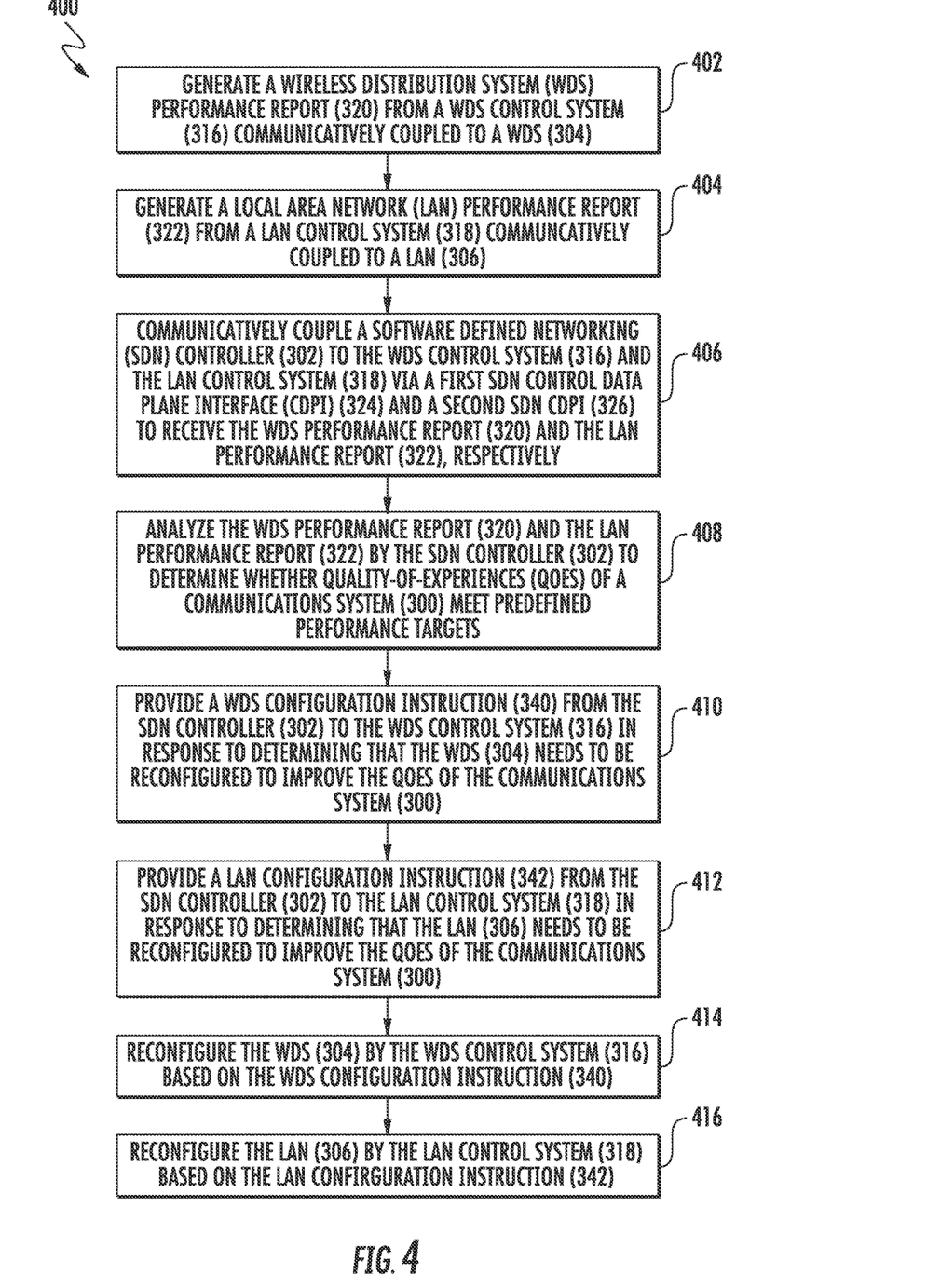
FIG. 4 is a flowchart of an exemplary process that can be employed to manage the communications system of FIG. 3 based on the SDN architecture.

With reference to FIG. 4, the WDS control system 316 that is communicatively coupled to the WDS 304 is configured to generate the WDS performance report 320 (block 402). The LAN control system 318 that is communicatively coupled to the LAN 306 is configured to generate the LAN performance report 322 (block 404). The SDN controller 302 is communicatively coupled to the WDS control system 316 and the LAN control system 318 via the first SDN CDPI 324 and the second SDN CDPI 326 to receive the WDS performance report 320 and the LAN performance report 322, respectively (block 406). The SDN controller 302 analyzes the WDS performance report 320 and the LAN performance report 322 to determine whether the QoEs of the communications system 300 meet the predefined performance targets (block 408). The SDN controller 302 provides the WDS configuration instruction 340 to the WDS control system 316 in response to determining that the WDS 304 needs to be reconfigured to improve the QoEs of the communications system 300 (block 410). The SDN controller 302 provides the LAN configuration instruction 342 to the LAN control system 318 in response to determining that the LAN 306 needs to be reconfigured to improve the QoEs of the communications system 300 (block 412). The WDS control system 316 reconfigures the WDS 304 based on the WDS configuration instruction 340 (block 414). The LAN control system 318 reconfigures the LAN 306 based on the LAN configuration instruction 342 (block 416).

Figure 5:
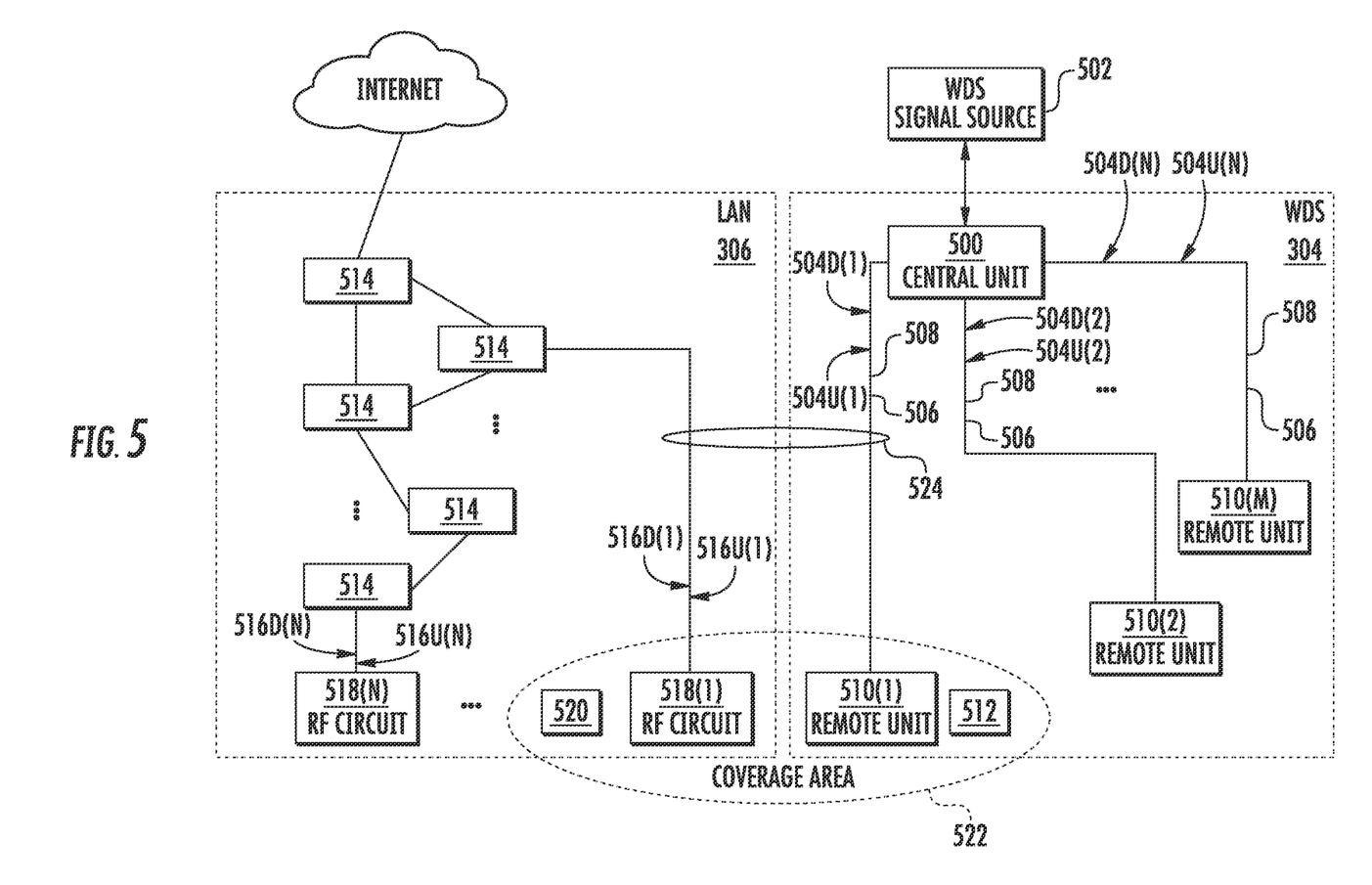
FIG. 5 is a schematic diagram providing an exemplary illustration of the WDS and the LAN in the communications system of FIG. 3.

With reference back to FIG. 3, the WDS 304 includes one or more WDS circuits that the WDS control system 316 can reconfigure based on the WDS configuration instruction 340 to improve the QoEs of the communications system 300. Likewise, the LAN 306 includes one or more LAN circuits that the LAN control system 318 can reconfigure based on the LAN configuration instruction 342 to improve the QoEs of the communications system 300. In this regard, FIG. 5 is a schematic diagram providing an exemplary illustration of the WDS 304 and the LAN 306 in the communications system 300 of FIG. 3. Common elements between FIGS. 3 and 5 are shown therein with common element numbers and will not be re-described herein.

With reference to FIG. 5, the WDS 304 includes a central unit 500 communicatively coupled to a WDS signal source 502. The central unit 500 is configured to distribute a plurality of WDS downlink communications signals 504D(1)-504D(M) over a WDS downlink communications medium 506 and receive a plurality of WDS uplink communications signals 504U(1)-504U(M) over a WDS uplink communications medium 508. The WDS 304 includes a plurality of remote units 510(1)-510(M). Each of the remote units 510(1)-510(M) is configured to receive a respective WDS downlink communications signal among the WDS downlink communications signals 504D(1)-504D(M) for distribution to at least one WDS client device 512. Each of the remote units 510(1)-510(M) is also configured to receive a respective WDS uplink communications signal among the WDS uplink communications signals 504U(1)-504U(M) from the WDS client device 512 for communication to the central unit 500.

The LAN 306 includes one or more LAN circuits 514 communicatively coupled to the Internet. The LAN circuits 514 are configured to distribute a plurality of LAN downlink communications signals 516D(1)-516D(N) and receive a plurality of LAN uplink communications signals 516U(1)-516U(N). In a non-limiting example, the LAN circuits 514 can include Ethernet switches, Ethernet bridges, and/or Internet Protocol (IP) routers. The LAN circuits 514 are interconnected with one or more RF circuits 518(1)-518(N) included in the LAN 306. In this regard, each of the RF circuits 518(1)-518(N) is configured to receive a respective LAN downlink communications signal among the LAN downlink communications signals 516D(1)-516D(N) for distribution to at least one LAN client device 520. Each of the RF circuits 518(1)-518(N) is also configured to receive a respective LAN uplink communications signal among the LAN uplink communications signals 516U(1)-516U(N) from the LAN client device 520 for communication to the LAN circuits 514. In a non-limiting example, the RF circuits 518(1)-518(N) can be Wi-Fi access points (APs), indoor base stations, and/or wireless repeaters.

The central unit 500 and/or the remote units 510(1)-510(M) can be configured to provide the operational status and QoE measurements of the WDS 304 to the WDS control system 316. Accordingly, the WDS control system 316 can reconfigure the central unit 500 and/or the remote units 510(1)-510(M) based on the WDS configuration instruction 340. Similarly, the LAN circuits 514 and/or the RF circuits 518(1)-518(N) can be configured to provide the operational status and QoE measurements of the LAN 306 to the LAN control system 318. Accordingly, the LAN control system 318 can reconfigure the LAN circuits 514 and/or the RF circuits 518(1)-518(N) based on the LAN configuration instruction 342.

In a non-limiting example, a selected remote unit 510(1) among the remote units 510(1)-510(M) is collocated in a coverage area 522 with a selected RF circuit 518(1) among the RF circuits 518(1)-518(N). The selected remote unit 510(1) and the selected RF circuit 518(1) may be configured to communicate with the central unit 500 and the LAN circuits 514, respectively, over a common optical-fiber trunk 524. For the convenience of reference and illustration, the selected remote unit 510(1), the WDS client device 512, the selected RF circuit 518(1), and the LAN client device 520 are discussed in the following optimization scenarios as non-limiting examples. It shall be appreciated that any combination of the remote units 510(1)-510(M) and the RF circuits 518(1)-518(N) can be optimized in the optimization scenarios described hereinafter.

In one example, the WDS control system 316 determines that the selected remote unit 510(1) is out of service. Accordingly, the WDS control system 316 generates and provides the WDS performance report 320 indicating that the selected remote unit 510(1) is out of service. In response to receiving the WDS performance report 320, the SDN controller 302 provides the LAN configuration instruction 342 to the LAN control system 318 to reconfigure quality-of-service (QoS) parameters of the LAN 306 to increase bandwidth of the selected RF circuit 518(1) that is collocated with the selected remote unit 510(1) in the coverage area 522. As a result, the WDS client device 512 can switch to receiving wireless services from the selected RF circuit 518(1) while the selected remote unit 510(1) is out of service.

In another example, the WDS control system 316 determines that the selected remote unit 510(1) is powered down. Accordingly, the WDS control system 316 generates and provides the WDS performance report 320 indicating that the selected remote unit 510(1) is powered down. In response to receiving the WDS performance report 320, the SDN controller 302 provides the LAN configuration instruction 342 to the LAN control system 318 to reconfigure QoS parameters of the LAN 306 to increase bandwidth of the selected RF circuit 518(1) that is collocated with the selected remote unit 510(1) in the coverage area 522. As a result, the WDS client device 512 can switch to receiving wireless services from the selected RF circuit 518(1) while the selected remote unit 510(1) is powered down.

In another example, the LAN control system 318 determines that the selected RF circuit 518(1) is out of service. Accordingly, the LAN control system 318 generates and provides the LAN performance report 322 indicating that the selected RF circuit 518(1) is out of service. In response to receiving the LAN performance report 322, the SDN controller 302 provides the WDS configuration instruction 340 to the WDS control system 316 to shift capacity to the selected remote unit 510(1) that is collocated with the selected RF circuit 518(1) in the coverage area 522. As a result, the LAN client device 520 can switch to receiving wireless services from the selected remote unit 510(1) while the selected RF circuit 518(1) is out of service.

In another example, the WDS control system 316 determines that the selected remote unit 510(1) has increased connection count. Accordingly, the WDS control system 316 generates and provides the WDS performance report 320 indicating that the selected remote unit 510(1) has increased connection count. In response to receiving the WDS performance report 320, the SDN controller 302 provides the LAN configuration instruction 342 to the LAN control system 318 to shift bandwidth allocation from the LAN 306 to the selected remote unit 510(1). As a result, the selected remote unit 510(1) can adequately handle the increased connection count.

In another example, the WDS control system 316 determines that the WDS client device 512 loses RF connection from the selected remote unit 510(1). Accordingly, the WDS control system 316 generates and provides the WDS performance report 320 indicating that the WDS client device 512 has lost RF connection from the selected remote unit 510(1). In response to receiving the WDS performance report 320, the SDN controller 302 provides the WDS configuration instruction 340 and the LAN configuration instruction 342 to the WDS control system 316 and the LAN control system 318, respectively, to move the WDS client device 512 from the selected remote unit 510(1) to the selected RF circuit 518(1) that is collocated with the selected remote unit 510(1).

In another example, the LAN control system 318 determines that the selected RF circuit 518(1) loses power. Accordingly, the LAN control system 318 generates and provides the LAN performance report 322 indicating that the selected RF circuit 518(1) has lost power. In response to receiving the LAN performance report 322, the SDN controller 302 provides the WDS configuration instruction 340 to the WDS control system 316 to shift capacity from the selected RF circuit 518(1) to the selected remote unit 510(1) that is collocated with the selected RF circuit 518(1) in the coverage area 522.

In another example, the LAN control system 318 determines that the selected RF circuit 518(1) is over capacity. Accordingly, the LAN control system 318 generates and provides the LAN performance report 322 indicating that the selected RF circuit 518(1) is over capacity. In response to receiving the LAN performance report 322, the SDN controller 302 provides the WDS configuration instruction 340 and the LAN configuration instruction 342 to the WDS control system 316 and the LAN control system 318, respectively, to move the LAN client device 520 associated with the selected RF circuit 518(1) to the selected remote unit 510(1) that is collocated with the selected RF circuit 518(1) in the coverage area 522.

In another example, the WDS control system 316 determines that the selected remote unit 510(1) experiences interference. Accordingly, the WDS control system 316 generates and provides the WDS performance report 320 indicating that the selected remote unit 510(1) experiences interference. In response to receiving the WDS performance report 320, the SDN controller 302 provides the WDS configuration instruction 340 and the LAN configuration instruction 342 to the WDS control system 316 and the LAN control system 318, respectively, to move the WDS client device 512 associated with the selected remote unit 510(1)

to the selected RF circuit 518(1) that is collocated with the selected remote unit 510(1) in the coverage area 522.

In another example, the WDS control system 316 determines that the selected remote unit 510(1) consumes excessive power. Accordingly, the WDS control system 316 generates and provides the WDS performance report 320 indicating that the selected remote unit 510(1) consumes excessive power. In response to receiving the WDS performance report 320, the SDN controller 302 provides the WDS configuration instruction 340 to the WDS control system 316 to reduce power supply to less critical service antennas in the selected remote unit 510(1).

In another example, the LAN control system 318 determines that the selected RF circuit 518(1) consumes excessive power. Accordingly, the LAN control system 318 generates and provides the LAN performance report 322 indicating that the selected RF circuit 518(1) consumes excessive power. In response to receiving the LAN performance report 322, the SDN controller 302 provides the LAN configuration instruction 342 to the LAN control system 318 to reduce power supply to less critical service antennas in the selected RF circuit 518(1).

In another example, the LAN control system 318 determines that the selected RF circuit 518(1) has increased connection count. Accordingly, the LAN control system 318 generates and provides the LAN performance report 322 indicating that the selected RF circuit 518(1) has increased connection count. In response to receiving the LAN performance report 322, the SDN controller 302 provides the WDS configuration instruction 340 to the WDS control system 316 to shift capacity from the WDS 304 to the selected RF circuit 518(1).

Figure 6:
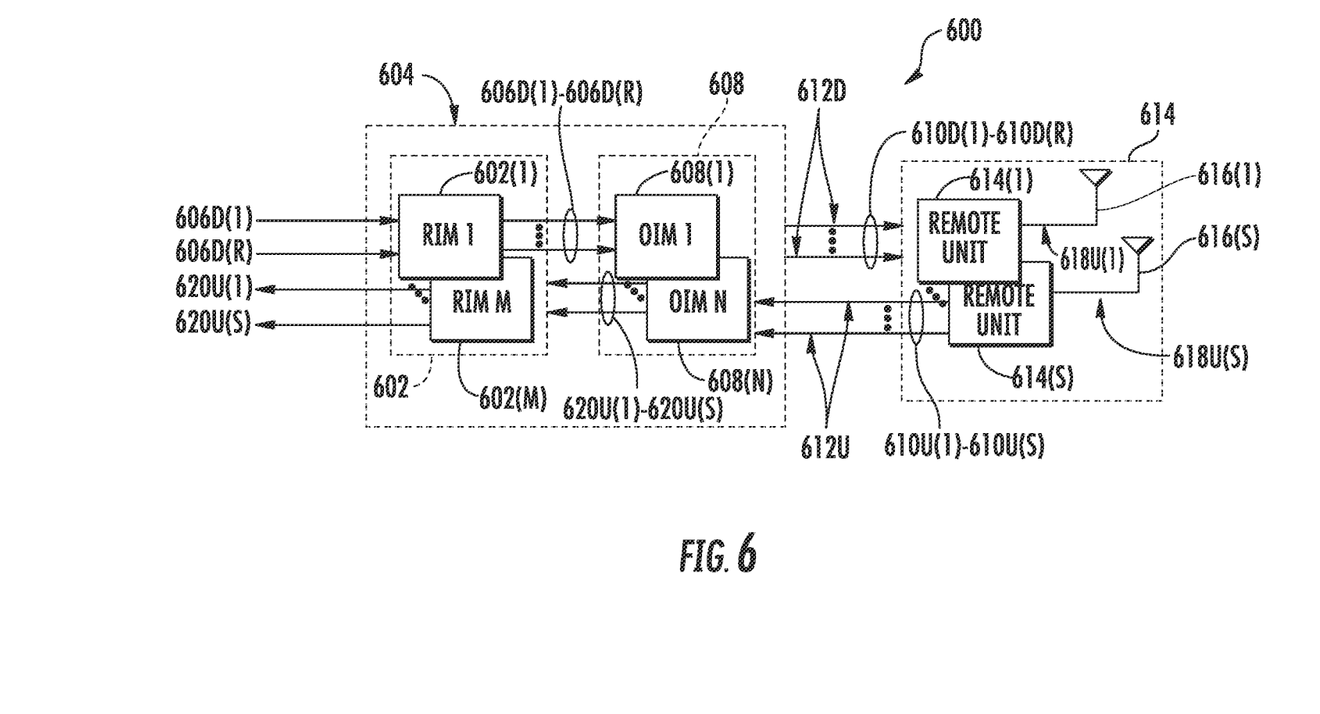
FIG. 6 is a schematic diagram of an exemplary WDS, such as the WDS of FIG. 3, provided in the form of an optical fiber-based WDS and managed via the SDN architecture of FIG. 3.

FIG. 6 is a schematic diagram of an exemplary WDS 600, such as the WDS 304 of FIG. 3, provided in the form of an optical fiber-based WDS and managed via the SDN architecture 308 of FIG. 3. The WDS 600 includes an optical fiber for distributing communications services for multiple frequency bands. The WDS 600 in this example is comprised of three (3) main components in this example. A plurality of radio interfaces provided in the form of radio interface modules (RIMs) 602(1)-602(M) are provided in a central unit 604 to receive and process a plurality of WDS downlink communications signals 606D(1)-606D(R) prior to optical conversion into WDS downlink optical fiber-based communications signals. The WDS downlink communications signals 606D(1)-606D(R) may be received from a base station as an example. The RIMs 602(1)-602(M) provide both downlink and uplink interfaces for signal processing. The notations "1-R" and "1-M" indicate that any number of the referenced component, 1-R and 1-M, respectively, may be provided. The central unit 604 is configured to accept the RIMs 602(1)-602(M) as modular components that can easily be installed and removed or replaced in the central unit 604. In one example, the central unit 604 is configured to support up to twelve (12) RIMs 602(1)-602(12). Each RIM 602(1)-602(M) can be designed to support a particular type of radio source or range of radio sources (i.e., frequencies) to provide flexibility in configuring the central unit 604 and the WDS 600 to support the desired radio sources.

For example, one RIM 602 may be configured to support the Personalized Communications System (PCS) radio band. Another RIM 602 may be configured to support the 800 megahertz (MHz) radio band. In this example, by inclusion of the RIMs 602(1)-602(M), the central unit 604 could be configured to support and distribute communications signals on both PCS and Long-Term Evolution (LTE) 700 radio bands, as an example. The RIMs 602(1)-602(M) may be provided in the central unit 604 that support any frequency bands desired, including but not limited to the US Cellular band, PCS band, Advanced Wireless Service (AWS) band, 700 MHz band, Global System for Mobile communications (GSM) 900, GSM 1800, and Universal Mobile Telecommunications System (UMTS). The RIMs 602(1)-602(M) may also be provided in the central unit 604 that support any wireless technologies desired, including but not limited to Code Division Multiple Access (CDMA), CDMA200, 1×RTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 602(1)-602(M) may be provided in the central unit 604 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 6, the WDS downlink communications signals 606D(1)-606D(R) are provided to a plurality of optical interfaces provided in the form of optical interface modules (OIMs) 608(1)-608(N) in this embodiment to convert the WDS downlink communications signals 606D(1)-606D(R) into a plurality of WDS downlink optical fiber-based communications signals 610D(1)-610D(R). The notation "1-N" indicates that any number of the referenced component 1-N may be provided. The OIMs 608(1)-608(N) may be configured to provide a plurality of optical interface components (OICs) that contain optical-to-electrical (O/E) and electrical-to-optical (E/O) converters, as will be described in more detail below. The OIMs 608(1)-608(N) support the radio bands that can be provided by the RIMs 602(1)-602(M), including the examples previously described above.

The OIMs 608(1)-608(N) each include E/O converters to convert the WDS downlink communications signals 606D(1)-606D(R) into the WDS downlink optical fiber-based communications signals 610D(1)-610D(R). The WDS downlink optical fiber-based communications signals 610D(1)-610D(R) are communicated over a downlink optical fiber-based communications medium 612D to a plurality of remote units 614(1)-614(S). The notation "1-S" indicates that any number of the referenced component 1-S may be provided. Remote unit O/E converters provided in the remote units 614(1)-614(S) convert the WDS downlink optical fiber-based communications signals 610D(1)-610D(R) back into the WDS downlink communications signals 606D(1)-606D(R), which are then provided to antennas 616(1)-616(S) in the remote units 614(1)-614(S) to client devices in the reception range of the antennas 616(1)-616(S).

The remote units 614(1)-614(S) receive a plurality of uplink RF communications signals from the client devices through the antennas 616(1)-616(S). The remote units 614(1)-614(S) covert the uplink RF communications signals into a plurality of WDS uplink communications signals 618U(1)-618U(S). Remote unit E/O converters are also provided in the remote units 614(1)-614(S) to convert the WDS uplink communications signals 618U(1)-618U(S) into a plurality of WDS uplink optical fiber-based communications signals 610U(1)-610U(S). The remote units 614(1)-614(S) communicate the WDS uplink optical fiber-based communications signals 610U(1)-610U(S) over an uplink optical fiber-based communications medium 612U to the OIMs 608(1)-608(N) in the central unit 604. The OIMs 608(1)-608(N) include O/E converters that convert the received WDS uplink optical fiber-based communications signals 610U(1)-610U(S) into a plurality of WDS uplink communications signals 620U(1)-620U(S), which are processed by the RIMs 602(1)-602(M) and provided as the WDS uplink communications signals 620U(1)-620U(S). The central unit 604 may provide the WDS uplink communications signals 620U(1)-620U(S) to a base station or other communications system.

Note that the downlink optical fiber-based communications medium 612D and the uplink optical fiber-based communications medium 612U connected to each of the remote units 614(1)-614(S) may be a common optical fiber-based communications medium, wherein for example, wave division multiplexing (WDM) is employed to provide the WDS downlink optical fiber-based communications signals 610D(1)-610D(R) and the WDS uplink optical fiber-based communications signals 610U(1)-610U(S) on the same optical fiber-based communications medium.

Figure 7:
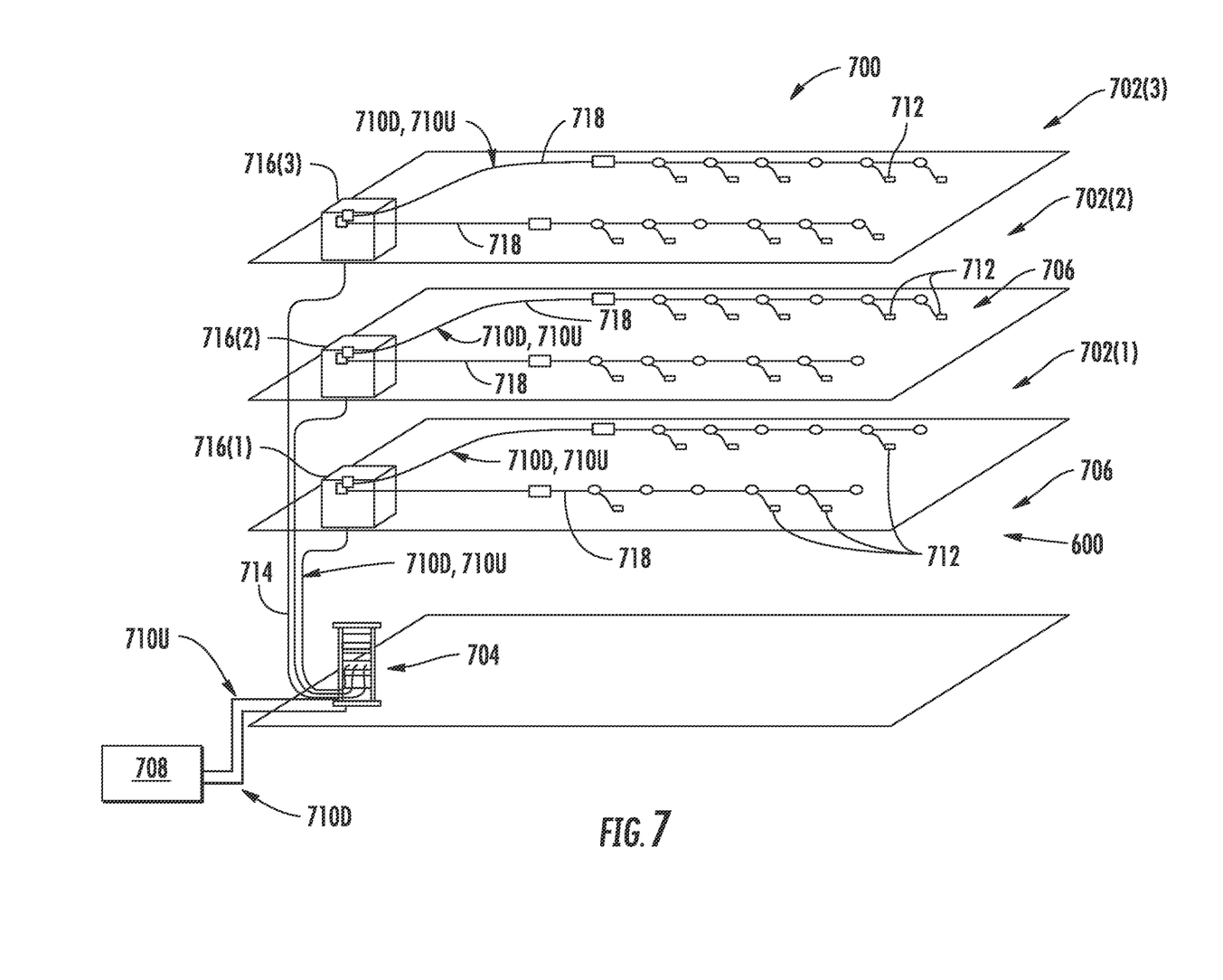
FIG. 7 is a partial schematic cut-away diagram of an exemplary building infrastructure in which a WDS, such as the WDS of FIG. 6, can be managed via the SDN architecture of FIG. 3.

The WDS 600 of FIG. 6 may be provided in an indoor environment, as illustrated in FIG. 7. FIG. 7 is a partial schematic cut-away diagram of an exemplary building infrastructure 700 in which a WDS, such as the WDS 600 of FIG. 6, can be managed via the SDN architecture 308 of FIG. 3. The building infrastructure 700 in this embodiment includes a first (ground) floor 702(1), a second floor 702(2), and a third floor 702(3). The floors 702(1)-702(3) are serviced by a central unit 704 to provide antenna coverage areas 706 in the building infrastructure 700. The central unit 704 is communicatively coupled to a base station 708 to receive downlink communications signals 710D from the base station 708. The central unit 704 is communicatively coupled to a plurality of remote units 712 to distribute the downlink communications signals 710D to the remote units 712 and to receive uplink communications signals 710U from the remote units 712, as previously discussed above. The downlink communications signals 710D and the uplink communications signals 710U communicated between the central unit 704 and the remote units 712 are carried over a riser cable 714. The riser cable 714 may be routed through interconnect units (ICUs) 716(1)-716(3) dedicated to each of the floors 702(1)-702(3) that route the downlink communications signals 710D and the uplink communications signals 710U to the remote units 712 and also provide power to the remote units 712 via array cables 718.

Figure 8:
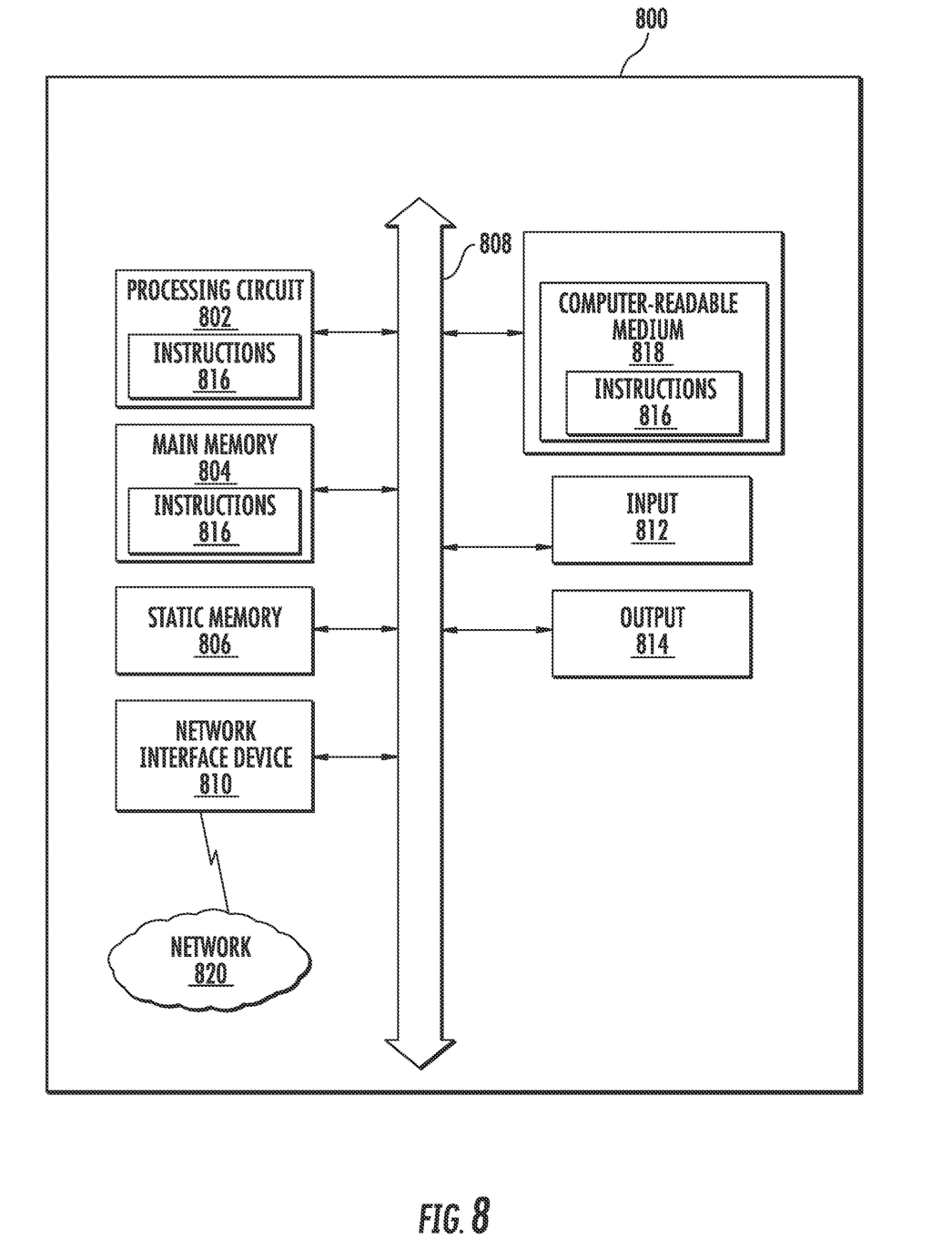
FIG. 8 is a schematic diagram representation of additional detail illustrating an exemplary computer system that could be employed in a controller, including the SDN controller of FIG. 3, for managing the communications system based on the SDN architecture of FIG. 3.

FIG. 8 is a schematic diagram representation of additional detail illustrating an exemplary computer system 800 that could be employed in a controller, including the SDN controller 302 of FIG. 3, for managing the communications system 300 based on the SDN architecture 308. In this regard, the computer system 800 is adapted to execute instructions from an exemplary computer-readable medium to perform these and/or any of the functions or processing described herein.

In this regard, the computer system 800 in FIG. 8 may include a set of instructions that may be executed to predict frequency interference to avoid or reduce interference in a multi-frequency DAS. The computer system 800 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 800 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 800 in this embodiment includes a processing circuit or processor 802, a main memory 804 (e.g., read-only memory (ROM), flash memory, dynamic random access memory (DRAM), such as synchronous DRAM (SDRAM), etc.), and a static memory 806 (e.g., flash memory, static random access memory (SRAM), etc.), which may communicate with each other via a data bus 808. In a non-limiting example, the main memory 804 and/or the static memory 806 can be used to store the predefined performance targets of the QoEs of the communications system 300. Alternatively, the processor 802 may be connected to the main memory 804 and/or the static memory 806 directly or via some other connectivity means. The processor 802 may be a controller, and the main memory 804 or the static memory 806 may be any type of memory.

The processor 802 represents one or more general-purpose processing devices, such as a microprocessor, central processing unit, or the like. More particularly, the processor 802 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 802 is configured to execute processing logic in instructions for performing the operations and steps discussed herein.

The computer system 800 may further include a network interface device 810. The computer system 800 also may or may not include an input 812, configured to receive input and selections to be communicated to the computer system 800 when executing instructions. The computer system 800 also may or may not include an output 814, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 800 may or may not include a data storage device that includes instructions 816 stored in a computer-readable medium 818. The instructions 816 may also reside, completely or at least partially, within the main memory 804 and/or within the processor 802 during execution thereof by the computer system 800, the main memory 804 and the processor 802 also constituting computer-readable medium. The instructions 816 may further be transmitted or received over a network 820 via the network interface device 810.

While the computer-readable medium 818 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A communications system, comprising:
   a wireless distribution system (WDS) comprising a central unit and a plurality of remote units coupled to the central unit by a plurality of cables;
   a local area network (LAN) comprising a plurality of LAN circuits interconnected to one or more radio frequency (RF) circuits;
   a WDS control system communicatively coupled to the WDS and configured to:
     generate a WDS performance report; and
     reconfigure the WDS based on a WDS configuration instruction;
   a LAN control system communicatively coupled to the LAN and configured to:
     generate a LAN performance report; and
     reconfigure the LAN based on a LAN configuration instruction; and
   a software defined networking (SDN) controller communicatively coupled to the WDS control system and the LAN control system via a first SDN control data plane interface (CDPI) and a second SDN CDPI, respectively, the SDN controller configured to:
     receive the WDS performance report and the LAN performance report from the WDS control system and the LAN control system, respectively;
     analyze the WDS performance report and the LAN performance report to determine whether quality-of-experiences (QoEs) of the communications system meet performance targets;
     provide the WDS configuration instruction to the WDS control system in response to determining that the WDS needs to be reconfigured to improve the QoEs of the communications system; and
     provide the LAN configuration instruction to the LAN control system in response to determining that the LAN needs to be reconfigured to improve the QoEs of the communications system, wherein:
   the WDS control system is configured to provide the WDS performance report to the SDN controller and receive the WDS configuration instruction from the SDN controller via the first SDN CDPI; and
   the LAN control system is configured to provide the LAN performance report to the SDN controller.

2. The communications system of claim 1, wherein the WDS control system is further configured to:
   determine a selected remote unit in the WDS that consumes excessive power; and
   generate the WDS performance report indicating the selected remote unit that consumes excessive power.

3. The communications system of claim 2, wherein the SDN controller is configured to provide the WDS configuration instruction to the WDS control system to reduce power supply to selected service antennas in the selected remote unit.

4. The communications system of claim 1, wherein the LAN control system is further configured to:
   determine a selected RF circuit in the LAN that consumes excessive power; and
   generate the LAN performance report indicating the selected RF circuit that consumes excessive power.

5. The communications system of claim 4, wherein the SDN controller is configured to provide the LAN configuration instruction to the LAN control system to reduce power supply to selected service antennas in the selected RF circuit.

6. The communications system of claim 1, wherein a central unit is configured to:
   distribute a plurality of WDS downlink communications signals over the plurality of cables; and
   receive a plurality of WDS uplink communications signals over the plurality of cables.

7. The communications system of claim 1, wherein the one or more RF circuits comprises a plurality of Wi-Fi access points.

8. A communications system, comprising:
   a wireless distribution system (WDS) comprising a central unit and a plurality of remote units coupled to the central unit by a plurality of cables;
   a local area network (LAN) comprising a plurality of LAN circuits interconnected to one or more radio frequency (RF) circuits;

a WDS control system communicatively coupled to the WDS and configured to:
  generate a WDS performance report indicating that a selected remote unit is out of service; and
  reconfigure the WDS based on a WDS configuration instruction;
a LAN control system communicatively coupled to the LAN and configured to:
  generate a LAN performance report; and
  reconfigure the LAN based on a LAN configuration instruction; and
a software defined networking (SDN) controller communicatively coupled to the WDS control system and the LAN control system via a first SDN control data plane interface (CDPI) and a second SDN CDPI, respectively, the SDN controller configured to:
  receive the WDS performance report and the LAN performance report from the WDS control system and the LAN control system, respectively;
  analyze the WDS performance report and the LAN performance report to determine whether quality-of-experiences (QoEs) of the communications system meet performance targets;
  provide the WDS configuration instruction to the WDS control system in response to determining that the WDS needs to be reconfigured to improve the QoEs of the communications system; and
  provide the LAN configuration instruction to the LAN control system in response to determining that the LAN needs to be reconfigured to improve the QoEs of the communications system, wherein,
  the SDN controller is configured to provide the LAN configuration instruction to the LAN control system to reconfigure the LAN.

9. The communications system of claim 8, wherein the WDS control system is further configured to:
  determine a selected remote unit in the WDS that consumes excessive power; and
  generate the WDS performance report indicating the selected remote unit that consumes excessive power.

10. The communications system of claim 8, wherein the LAN control system is further configured to:
  determine a selected RF circuit in the LAN that consumes excessive power; and
  generate the LAN performance report indicating the selected RF circuit that consumes excessive power.

11. The communications system of claim 8, wherein each of the plurality of remote units is configured to:
  receive a respective WDS downlink communications signal among a plurality of WDS downlink communications signals for distribution to at least one WDS client device; and
  receive a respective WDS uplink communications signal among a plurality of WDS uplink communications signals from the at least one WDS client device for communication to the central unit.

12. The communications system of claim 11, wherein the one or more RF circuits comprises a plurality of Wi-Fi access points.

13. A communications system, comprising:
a wireless distribution system (WDS) comprising a central unit and a plurality of remote units coupled to the central unit by a plurality of cables;
a local area network (LAN) comprising a plurality of LAN circuits interconnected to one or more radio frequency (RF) circuits;
a WDS control system communicatively coupled to the WDS and configured to:
  generate a WDS performance report indicating that a remote unit in the WDS is powered down; and
  reconfigure the WDS based on a WDS configuration instruction;
a LAN control system communicatively coupled to the LAN and configured to:
  generate a LAN performance report; and
  reconfigure the LAN based on a LAN configuration instruction; and
a software defined networking (SDN) controller communicatively coupled to the WDS control system and the LAN control system via a first SDN control data plane interface (CDPI) and a second SDN CDPI, respectively, the SDN controller configured to:
  receive the WDS performance report and the LAN performance report from the WDS control system and the LAN control system, respectively;
  analyze the WDS performance report and the LAN performance report to determine whether quality-of-experiences (QoEs) of the communications system meet performance targets;
  provide the WDS configuration instruction to the WDS control system in response to determining that the WDS needs to be reconfigured; and
  provide the LAN configuration instruction to the LAN control system in response to determining that the LAN needs to be reconfigured, wherein,
  the SDN controller is configured to provide the LAN configuration instruction to the LAN control system to reconfigure the LAN to increase bandwidth of a selected RF circuit in the LAN.

14. The communications system of claim 13, wherein the WDS control system is further configured to:
  determine a selected remote unit in the WDS that consumes excessive power; and
  generate the WDS performance report indicating the selected remote unit that consumes excessive power.

15. The communications system of claim 13, wherein the LAN control system is further configured to:
  determine a selected RF circuit in the LAN that consumes excessive power; and
  generate the LAN performance report indicating the selected RF circuit that consumes excessive power.

16. The communications system of claim 13, wherein each of the plurality of remote units is configured to:
  receive a respective WDS downlink communications signal among a plurality of WDS downlink communications signals for distribution to at least one WDS client device; and
  receive a respective WDS uplink communications signal among a plurality of WDS uplink communications signals from the at least one WDS client device for communication to the central unit.

17. A communications system, comprising:
a wireless distribution system (WDS) comprising a central unit and a plurality of remote units communicatively coupled to the central unit;
a local area network (LAN) comprising a plurality of LAN circuits interconnected to one or more radio frequency (RF) circuits;
a WDS control system communicatively coupled to the WDS and configured to:
  generate a WDS performance report; and
  reconfigure the WDS based on a WDS configuration instruction;

a LAN control system communicatively coupled to the LAN and configured to:
  generate a LAN performance report indicating that a selected RF circuit is out of service or loses power; and
  reconfigure the LAN based on a LAN configuration instruction; and
a software defined networking (SDN) controller communicatively coupled to the WDS control system and the LAN control system via a first SDN control data plane interface (CDPI) and a second SDN CDPI, respectively, the SDN controller configured to:
  receive the WDS performance report and the LAN performance report from the WDS control system and the LAN control system, respectively;
  analyze the WDS performance report and the LAN performance report to determine whether quality-of-experiences (QoEs) of the communications system meet performance targets;
  provide the WDS configuration instruction to the WDS control system in response to determining that the WDS needs to be reconfigured to improve the QoEs of the communications system; and
  provide the LAN configuration instruction to the LAN control system in response to determining that the LAN needs to be reconfigured to improve the QoEs of the communications system, wherein
  the SDN controller is configured to provide the WDS configuration instruction to the WDS control system to shift capacity to a selected remote unit in the WDS that is collocated with the selected RF circuit.

18. The communications system of claim 17, wherein each of the plurality of remote units is configured to:
  receive a respective WDS downlink communications signal among a plurality of WDS downlink communications signals for distribution to at least one WDS client device; and
  receive a respective WDS uplink communications signal among a plurality of WDS uplink communications signals from the at least one WDS client device for communication to the central unit.

19. The communications system of claim 17, wherein the one or more RF circuits comprises a plurality of Wi-Fi access points.

* * * * *